Jan. 5, 1971  R. M. KEMMERER ET AL  3,552,769
SAFETY APPARATUS

Filed Oct. 2, 1968  2 Sheets-Sheet 1

INVENTORS
ROBERT M. KEMMERER
RICHARD CHUTE
BY
Yount, Flynn & Tarolli
ATTORNEYS

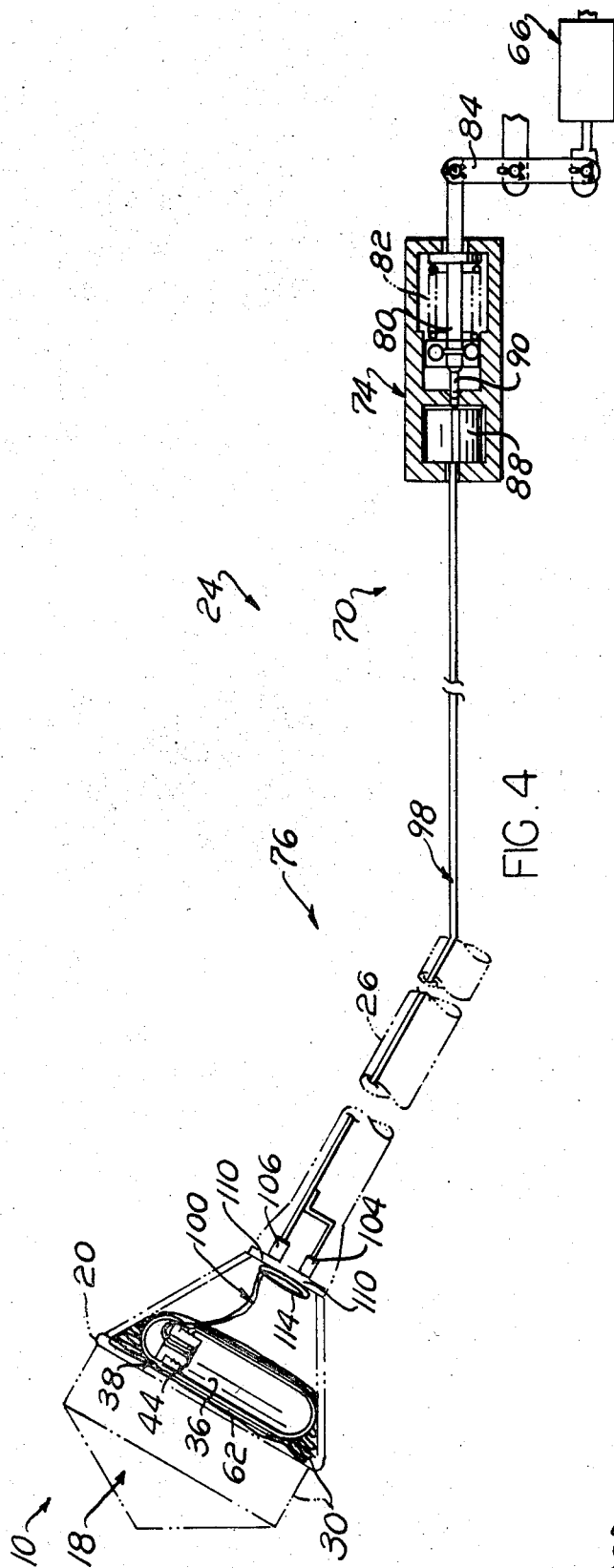
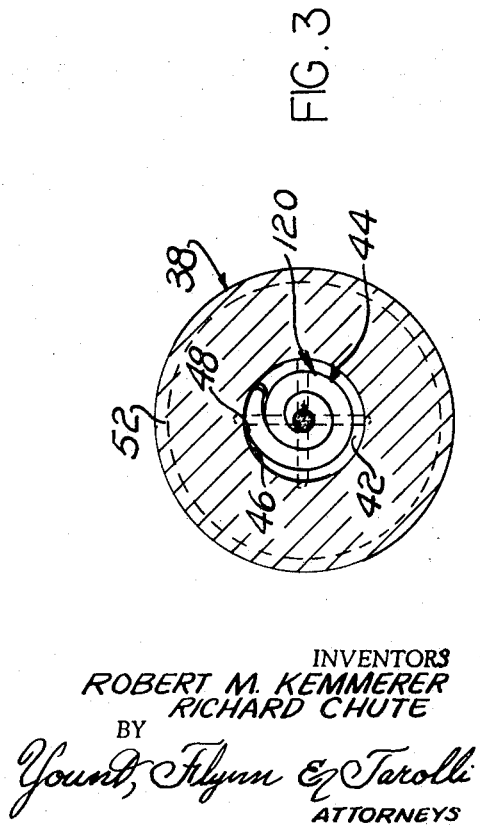

United States Patent Office 3,552,769
Patented Jan. 5, 1971

3,552,769
SAFETY APPARATUS
Robert M. Kemmerer, Southgate, and Richard Chute, Huntington Woods, Mich., assignors to Eaton Yale & Towne Inc., Cleveland, Ohio, a corporation of Ohio
Filed Oct. 2, 1968, Ser. No. 764,502
Int. Cl. B60r 21/00
U.S. Cl. 280—150                              24 Claims

ABSTRACT OF THE DISCLOSURE

An improved safety apparatus for protecting an occupant of a vehicle during an accident includes an expansible confinement for restraining movement of the occupant during the accident. A sensor assembly senses an accident condition and ignites a detonating fuse assembly which in turn activates a source of fluid to inflate the confinement in response to operation of the sensor assembly.

---

This invention relates generally to safety apparatus and more particularly to a system for effecting the operation of a vehicle safety device upon the occurrence of an accident.

A known vehicle safety apparatus includes an expansible confinement, a sensor assembly for detecting the occurrence of a collision, and a source of fluid. The source of fluid is placed in fluid communication with the confinement in response to operation of the sensor assembly to thereby inflate the confinement and restrain the occupant of the vehicle against movement. Electrical circuitry has heretofore been used for providing for fluid flow from the fluid source in response to operation of the sensor assembly. After a period of time, this electrical circuitry may tend to become unreliable in operation as a result of contacts corroding or wires becoming brittle and breaking. In addition, the electrical circuitry may cause false or unwanted operation of the safety apparatus due to extraneous electrical currents or may not operate when required due to a shorting out of the electrical circuitry.

Accordingly, it is an object of this invention to provide a new and improved safety apparatus which includes a reliable, rapid operating nonelectrical system for actuating a safety device upon the occurrence of an accident.

Another object of this invention is to provide a new and improved nonelectrical safety apparatus including a sensor assembly for detecting the occurrence of an accident, explosive means for actuating a safety device, and nonelectrical means for activating the explosive means in response to operation of the sensor assembly to thereby provide for the operation of the safety device to protect an occupant of a vehicle during the accident.

Another objet of this invention is to provide a new and improved safety apparatus including a confinement which is expandable to protect an occupant of a vehicle during an accident, a source of fluid for expanding the confinement, a sensor assembly for detecting the occurrence of an accident, and wherein detonating fuse means operatively connects the sensor assembly with the source of fluid to activate the source of fluid upon operation of the sensor assembly.

Another object of this invention is to provide a new and improved safety apparatus including a confinement which is expandable to protect a driver of a vehicle during an accident, a source of fluid mounted on the steering wheel of the vehicle for expanding the confinement, a sensor assembly for detecting the occurrence of a collision, and wherein a simple, reliable nonelectrical means operatively connects the sensor assembly with the source of fluid to activate the the source of fluid upon operation of the sensor assembly.

These and other objects and features of the invention will become more apparent upon a consideration of the following description made with reference to the accompanying drawing wherein:

FIG. 3 is a schematic illustration, taken on an enlarged scale along the line 3—3 of FIG. 2, showing the construction of an explosive valve assembly for controlling flow of fluid from a source of fluid; and FIG. 4 is a schematic illustration of the safety apparatus of FIG. 1.

The present invention provides a nonelectrical system for operatively operating a safety device for protecting an occupant of a vehicle during an accident. The nonelectrical system is activated in response to operation of a sensor assembly, and includes detonating fuse means which is activated or detonated, upon operation of the sensor assembly, to actuate an explosive valve assembly in the safety device. When the safety device is to protect the driver of the vehicle during a collision, the safety device is advantageously mounted on the steering wheel of the vehicle for rotation therewith. To provide for this rotation of the steering wheel and safety device, the detonating fuse may include a first or forward section mounted on the steering column and a second or rearward section mounted on the steering wheel. The section of detonating fuse on the steering wheel is positioned in such a manner as to be activated by the detonation of blasting caps or other explosive devices connected to the section of detonating fuse mounted on the steering column.

Figure 1:
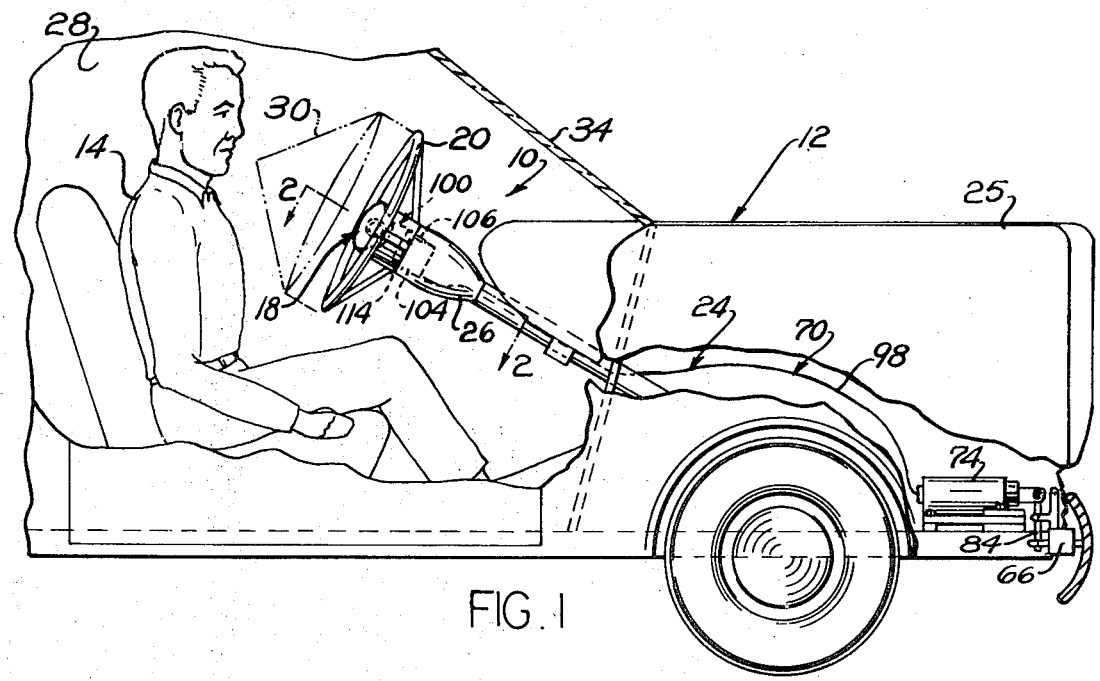
FIG. 1 is a schematic illustration of a vehicle having a safety apparatus constructed in accordance with the present invention for protecting a driver of the vehicle during an accident.

Although the present invention can be used to protect occupants of many different types of vehicles, such as trucks, boats, and airplanes, a safety apparatus 10 constructed in accordance with the present invention is illustrated in FIG. 1 in an automobile 12. The safety apparatus 10 is adapted to protect a driver 14 of the automobile 12 and includes a safety device 18 mounted on a steering wheel 20 of the automobile and an actuating system 24 extending from a forward portion 25 of the automobile through the steering column 26 into a passenger compartment 28 of the vehicle to operate the safety device upon the occurrence of a collision. Operation of the safety device 18 results in an expansible confinement 30 being expanded from a collapsed condition shown in FIG. 2 to an expanded or operative condition shown in dashed lines in FIGS. 1 and 4. In the expanded condition the confinement 30 restrains forward movement of the driver 14 relative to the steering wheel 20 and windshield 34 to thereby protect the driver 14 during an accident, such as a collision.

Figure 2:
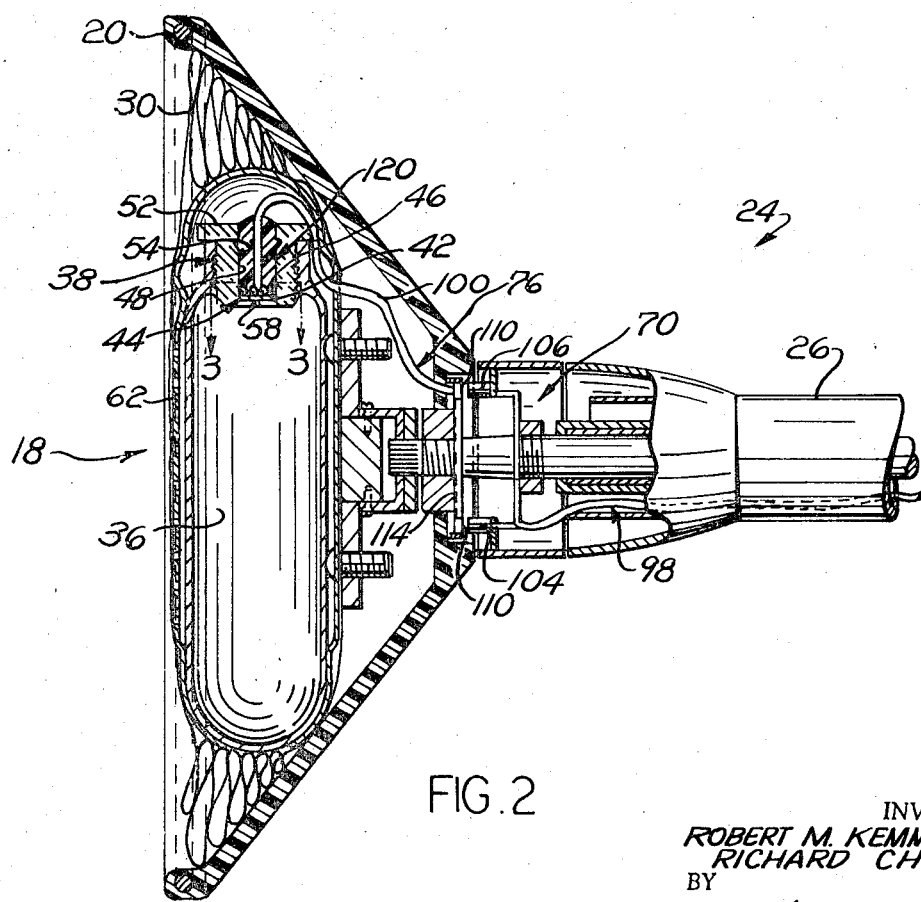
FIG. 2 is an enlarged sectional view of a portion of the safety apparatus of FIG. 1 illustrating the relationship between an expansible confinement, a source of fluid for expanding the confinement, and an actuating system for activating the source of fluid to expand the confinement.

Since the illustrated embodiment of the invention is intended to protect the driver 14 of the vehicle 12 during an accident, the confinement 30 and a source of fluid, in the present instance a reservoir 36 of high-pressure gas, are mounted on the steering wheel 20 of the vehicle (see FIG. 2). An explosive valve assembly 38 is mounted on the reservoir 36 and is operated from the illustrated closed condition blocking a flow of fluid from the reservoir to an open condition by rupturing or releasing a wall 42 thereof. The wall 42 is ruptured by detonating an explosive means or charge 44 (see FIG. 3 also) which is retained in a chamber 46 formed in a fluid passageway 48 in a plug member 52 by a highly incompressible, friable, or fragmentable material 54 (FIG. 2). Upon detonation of the explosive charge 44, the material 54 is fragmented and the wall 42 tends to break or rupture along grooves 58 provided in the wall to enable fluid to flow from the reservoir 36 through the passageway 48 to expand the confinement 30 from the collapsed condition of FIG. 2 to the expanded condition shown in dashed lines in FIG. 1. A diffuser 62 is advantageously associated with the reservoir 36 to direct this flow of fluid to inflate the confinement 30 in a predetermined manner. The mounting of the reservoir 36, diffuser 62 and confinement 30 is more fully disclosed in application Ser. No. 674,810, filed Oct. 12, 1967, by Richard Chute and entitled "Vehicle Safety Device." Therefore, to avoid needless prolixity of description, the mounting of the reservoir 36, diffuser 62 and confinement 30 on the steering wheel 20 will not be further described herein.

The actuating system 24 activates the source of fluid (i.e. the reservoir 36) to inflate the confinement 30 upon the vehicle 12 encountering an accident condition. To this end the actuating system 24 includes a mechanical or nonelectrical sensor assembly 66 which is operated in response to an accident condition, such as deformation or crushing of a part of the vehicle. The sensor assembly 66 in turn activates a detonating fuse assembly 70 (FIG. 4). The detonating fuse assembly 70 is connected to the explosive valve assembly 38 and is effective to operate the explosive valve assembly 38, by detonating the charge 44, to activate the source of fluid and inflate the confinement 30. Although the detonating fuse assembly 70, as illustrated herein, is particularly well adapted for inflating the confinement 30 mounted on the steering wheel 20 to protect the driver 14 of the vehicle, it should be understood that the detonating fuse assembly 70 can be used to activate safety devices other than the illustrated safety device 18 to protect occupants of a vehicle other than the driver 14.

The detonating fuse assembly 70 operatively interconnects the sensor assembly 66 (see FIG. 4) and the explosive valve assembly 38 to operate the explosive valve assembly in response to operation of the sensor assembly. Accordingly, the detonating fuse assembly 70 includes an initiator or firing assembly 74 for detonating or activating detonating fuse 76 in response to operation of the sensor assembly 66. The initiator assembly 74 is of a well known nonelectrical type and includes a plunger 80 which is moved toward the right, as viewed in FIG. 4, against the influence of a biasing spring 82 by a suitable linkage 84 which is connected to the nonelectrical sensor 66. When the plunger 80 has been moved to the right for a predetermined distance, the plunger is released by a known ball-type of latch arrangement to enable the plunger to be moved rapidly toward the left to detonate a cartridge 88. The plunger 80 has a firing pin 90 on a forward end thereof to effect detonation of the cartridge 88. The detonating fuse 76 is activated or detonated by the firing of the cartridge 88.

In order to inflate the confinement 30 before the driver 14 has moved forwardly into engagement with the steering wheel 20 and windshield 34 under the influence of collision forces, it is necessary for the detonating fuse 76 to operate the explosive valve assembly 38 immediately after the sensor assembly 66 detects the occurrence of a collision. Accordingly, the detonating fuse 76 has a velocity of detonation which is in excess of ten thousand feet per second. In one embodiment of the invention, "Primacord" having an average velocity of detonation of between twenty thousand and twenty-one thousand feet per second may be used. This rapid burning rate or velocity of detonation is obtained by encasing an explosive core in a textile braid covered by a plastic jacket and textile yarn. This covering has the advantage of being resistant to penetration by either water or oil and is flexible while being rugged and break resistant. In addition, the detonating fuse 76 is reliable in operation after long periods of lying dormant before the vehicle encounters a collision.

During the operation of the vehicle 12, the steering wheel 20 is rotated relative to the steering column or steering wheel support assembly 26 to control the direction of movement of the vehicle. To enable the safety device 18 to be rotated with the steering wheel 20 relative to the steering column 26, the detonating fuse 76 includes a first section 98 extending from the initiator assembly 74 to an area on the steering column 26 immediately below or adjacent to the steering wheel 20 (see FIG. 2). A second or rearword section 100 of detonating fuse is mounted on the steering wheel 20 and extends from the explosive valve assembly 38 to an area of the steering wheel immediately adjacent to the steering column 26. The forward section 98 of detonating fuse is connected to a pair of spaced apart, nonelectrical explosive devices or blasting caps 104 and 106 which are mounted on the steering column 26 and are spaced a relatively small distance from the steering wheel 20. Immediately after detonation or activation of the forward section 98 of detonating fuse by the initiator assembly 74, the blasting caps 104 and 106 are detonated or activated to detonate or activate the rearward section 100 of detonating fuse across a small gap 110 between the steering column 26 and steering wheel 20. Although detonation of either one of the blasting caps 104 or 106 would be sufficient to activate the rearward section 100 of detonating fuse, a pair of blasting caps are provided to insure the activation of the rearward section of detonating fuse. Of course, activation of the rearward section 100 of detonating fuse results in the explosive valve assembly 38 being operated by activation or detonation of the explosive charge 44.

During rotation of the steering wheel 20 the rearward section 100 of detonating fuse is rotated relative to the forward section 98 of detonating fuse. Since the vehicle 12 may become involved in an accident with the steering wheel 20 rotated to any one of an infinite number of positions relative to the steering column 26, the rearward section 100 of detonating fuse includes a generally circular loop or ring 114 (see FIGS. 2 and 4) which is positioned adjacent to the blasting caps 104 and 106. Upon rotation of the steering wheel 20, the loop or ring 114 of detonating fuse is rotated so that a part of the ring is at all times immediately adjacent to the blasting caps 104 and 106. Therefore, the forward section 98 of detonating fuse can effect the activation of the rearward section 100 of detonating fuse and the operation of the explosive valve assembly 38 for all positions of rotation of the steering wheel 20 relative to the steering column 26.

The explosive charge 44 in the valve assembly 38 is detonated or activated by the rearward section 100 of detonating fuse. This detonation of the explosive charge 44 is assured by forming the explosive charge from a section 120 (FIG. 3) of detonating fuse which is a continuation of the detonating fuse 100. Accordingly, the section of detonating fuse 120 is coiled in a spiral between the friable or fragmentable material 54 and the wall 42 to provide an explosive charge 44 of sufficient strength to rupture the wall 42 in the manner explained in application Ser. No. 730,024, filed May 17, 1968, by George H. Ekstrom. Of course, the explosive charge 44 could, if desired, be formed in a manner other than by the use of detonating fuse. It should be noted that the explosive charge 44 and the blasting caps 104 and 106 are positioned in such a manner as to perform their intended functions i.e. the operation of the valve assembly 38 and the activation of the section 100 of detonating fuse, without endangering the driver of the vehicle.

In view of the foregoing remarks, it can be seen that the nonelectrical actuating system 24 includes the mechanical sensor assembly 66 which operates the initiator assembly 74 upon the occurrence of a collision to detonate or activate the detonating fuse 76 to thereby operate the safety device 18 and protect an occupant of the vehicle. The activating system is nonelectrical in nature, that is the actuating system operates independently of electrical energy, so that it is extremely reliable even after being dormant for long periods of time. The sensor assembly 66 is advantageously mounted on the forward portion 25 of the vehicle 12 (see FIG. 1) while the safety device 18 is at least partially mounted within a passenger compartment 28 of the vehicle to enable the safety device to effectively protect the occupants of the vehicle during a collision. The use of detonating fuse 76 having a velocity of detonation in excess of ten thousand feet per second enables the safety apparatus 18 to be quickly activated in response to operation of the sensor assembly 66.

Although the safety apparatus 10 can be utilized to protect other occupants of a vehicle, the safety apparatus is particularly well adapted to protect the driver 14 of a vehicle since the safety device 13 can be mounted on the steering wheel 20. The use of the forward section 98 of detonating fuse mounted on the steering column 26 to activate the rearward section 100 of detonating fuse mounted on the steering wheel 20, enables the steering wheel to rotate relative to the steering column. This activation of the rearward section 100 of detonating fuse actuates the explosive valve assembly 38 to the open condition to enable fluid to flow from the reservoir 38 to inflate the confinement 30.

Having fully disclosed our invention, we claim the following:

1. Safety apparatus for protecting a driver of a vehicle during an accident, said safety apparatus comprising means expandable from a first condition to a second condition in which said expandable means is adapted to restrain movement of the driver during an accident, said expandable means being mounted on the steering wheel of the vehicle for rotation therewith, a source of fluid for expanding said expandable means, sensor means for detecting the occurrence of an accident, and nonelectrical means operatively connected to said sensor means and said source of fluid for activating said source of fluid in response to operation of said sensor means to expand said expandable means to said second condition.

2. Safety apparatus as set forth in claim 1 wherein said nonelectrical means is destructable to effect a flow of fluid from said source of fluid, said sensor means including means for initiating destruction of said nonelectrical means in reponse to the occurrence of an accident.

3. Safety apparatus as set forth in claim 2 wherein said nonelectrical means includes detonating fuse means for operatively interconnecting said sensor means and said source of fluid.

4. Safety apparatus for protecting an occupant of a vehicle during an accident, said safety apparatus comprising means expandable from a first condition to a second condition in which said expandable means is adapted to restrain movement of the occupant during an accident, means for providing a source of fluid for expanding said expandable means, detonating fuse means for activating said means for providing a source of fluid to expand said expandable means, and means spaced from said means for providing a source of fluid for activating said detonating fuse means in response to the occurrence of an accident to effect expansion of said expandable means to protect the occupant during the accident, said detonating fuse means extending from said means for activating said detonating fuse means in response to the occurrence of an accident to said means for providing a source of fluid to enable said detonating fuse means to activate said means for providing a source of fluid to thereby effect expansion of said expandable means upon the occurrence of an accident.

5. Safety apparatus for protecting a driver of a vehicle during an accident, said safety apparatus comprising means expandable from a first condition to a second condition in which said expandable means is adapted to restrain movement of the driver during an accident, a source of fluid mounted on the steering wheel of the vehicle for expanding said expandable means, sensor means for detecting the occurrence of an accident, and nonelectrical means operatively connected to sad sensor means and said source of fluid for activating said source of fluid in response to operation of said sensor means to expand said expandable means to said second condition, said nonelectrical means comprising detonating fuse.

6. Safety apparatus for protecting a driver of a vehicle during an accident, said safety apparatus comprising means expandable from a first condition to a second condition in which said expandable means is adapted to restrain movement of the driver during an accident, a source of fluid mounted on the steering wheel of the vehicle for expanding said expandable means, sensor means for detecting the occurrence of an accident, and nonelectrical means operatively connected to said sensor means and said source of fluid for activating said source of fluid in response to operation of said sensor means to expand said expandable means to said second condition, said nonelectrical means including a first portion of detonatable material and second portion of detonatable material mounted on the steering wheel for rotation therewith, said first portion of detonatable material being activated in response to operation of said sensor means to activate said second portion of detonatable material to thereby provide for the aforesaid activation of said source of fluid.

7. Safety apparatus for protecting a driver of a vehicle during an accident, said safety apparatus comprising means expandable from a first condition to a second condition in which said expandable means is adapted to restrain movement of the driver during an accident, a source of fluid mounted on the steering wheel of the vehicle for expanding said expandable means, sensor means for detecting the occurrence of an accident, and nonelectrical means operatively connected to said sensor means and said source of fluid for activating said source of fluid in response to operation of said sensor means to expand said expandable means to said second condition, said nonelectrical means including a first section of detonating fuse operatively connected with said sensor means and at least partially mounted on a support assembly for the steering wheel and a second section of detonating fuse operatively connected with said source of fluid and mounted on the steering wheel for rotation therewith relative to said first section of detonating fuse, said first section of detonating fuse being activated in response of said sensor means, said second section of detonating fuse being activated in response to activation of said first section of detonating fuse to provide for the activation of said source of fluid.

8. Safety apparatus as set forth in claim 7 wherein said nonelectrical means further includes explosive means mounted on the support assembly for the steering wheel and adapted to be detonated by said first section of detonating fuse to activate said second section of detonating fuse.

9. Safety apparatus as set forth in claim 8 wherein said nonelectrical means further includes explosive firing means operatively connected to said sensor means for activating said first section of detonating fuse.

10. Safety apparatus as set forth in claim 7 further including means for blocking a flow of fluid from said source of fluid to said expansible means and operable in response to activation of said second section of detonating fuse to connect said expansible means in fluid communication with said source of fluid.

11. Safety apparatus for protecting an occupant of a vehicle during an accident, said safety apparatus comprising means expandable from a first condition to a second condition in which said expandable means is adapted to restrain movement of the occupant during an accident, a source of fluid for expanding said expandable means, detonating fuse means operatively connected with said source of fluid for activating said source of fluid to expand said expandable means, and means for activating said detonating fuse means to effect expansion of said expandable means to protect the occupant during an accident, said means for activating said detonating fuse comprising sensor means mounted on a portion of the vehicle forwardly of a passenger compartment of the vehicle, said detonating fuse means extending from said sensor means to said fluid source and operated in response to operation of said sensor means.

12. Safety apparatus as set forth in claim 11 wherein said detonating fuse means includes an initiator assembly operatively connected to said sensor means for activating said detonating fuse means in response to operation of said sensor means.

13. Safety apparatus as set forth in claim 11 wherein said source of fluid is mounted on the steering wheel of the vehicle for rotation therewith relative to a steering wheel support assembly, said detonating fuse means including a first section of detonating fuse at least a portion which is mounted on said steering wheel support assembly and a second section of detonating fuse mounted on the steering wheel, said first section of detonating fuse being activated in response to operation of said sensor means, said second section of detonating fuse being activated in response to activation of said first section of detonating fuse to provide for the activation of said source of fluid.

14. Safety apparatus as set forth in claim 13 wherein said detonating fuse means further includes explosive means mounted on the support assembly for the steering wheel and adapted to be detonated by said first section of detonating fuse to activate said second section of detonating fuse, said second section of detonating fuse having a substantially circular configuration and being mounted on the steering wheel in such a manner that a portion of said second section of detonating fuse is adjacent to said explosive means at all times during a revolution of the steering wheel relative to the steering wheel support assembly to thereby enable said explosive means to activate said second section of detonating fuse for all positions of the steering wheel in a revolution of the steering wheel relative to the steering wheel support assembly.

15. Safety apparatus for protecting an occupant of a vehicle during an accident, said safety apparatus comprising means expandable from a first condition to a second condition in which said expandable means is adapted to restrain movement of the occupant during an accident, a source of fluid for expanding said expandable means, detonating fuse means operatively connected with said source of fluid for activating said source of fluid to expand said expandable means, means for activating said detonating fuse means to effect expansion of said expandable means to protect the occupant during an accident, and valve means for controlling the flow of fluid from said source of fluid to said expandable means including a section of detonating fuse mounted in a chamber defined by said valve means and activatable to operate said valve means from a first condition blocking a flow of fluid from said source of fluid to said expandable means to a second condition enabling fluid to flow from said source of fluid to said expandable means.

16. Safety apparatus as set forth in claim 15 wherein said valve means includes at least one wall defining said chamber, said one wall being ruptured by the aforesaid activation of said section of detonating fuse to operate said valve means from said first condition to said second condition.

17. A nonelectrical system to operate a safety device for protecting an occupant of a vehicle during an accident, said system inlcuding mechanically operated sensor means for detecting the occurrence of an accident, explosive means for actuating the safety device, and nonelectrical means for activating said explosive means in response to operation of said sensor means, said nonelectrical means including detonatable material operatively connecting said sensor means with said explosive means, said detonatable material having a velocity of detonation in excess of ten thousand feet per second to enable said nonelectrical means to quickly activate said explosive means upon operation of said sensor means, said safety device being mounted on the steering wheel of a vehicle for rotation relative to a steering wheel support assembly and said detonatable material including a first section of detonatable material mounted on said steering wheel support assembly and a second section of detonatable material mounted on the steering wheel for rotation relative to said first section of detonatable material with said steering wheel and safety device.

18. A system as set forth in claim 17 wherein said nonelectrical means further includes an initiator assembly responsive to operation of said sensor means to activate said detonatable material.

19. A system as set forth in claim 17 wherein said explosive means is mounted in association with flow control valve means in said safety device for controlling a flow of fluid, said flow control valve means being operated from a condition blocking a flow of fluid to a condition enabling fluid to flow by activation of said explosive means.

20. A system as set forth in claim 17 wherein said sensor means is mounted on a portion of the vehicle forwardly of a passenger compartment of the vehicle and said explosive means is mounted in the passenger compartment of the vehicle and operatively connected with said sensor means by said nonelectrical means which extend through a wall of the passenger compartment.

21. Safety apparatus for protecting an occupant of a vehicle during an accident, safety apparatus comprising a confinement expandable from a collapsed condition to an expanded condition to restrain movement of an occupant of the vehicle during an accident, container means for holding a supply of fluid under pressure, means for opening said container means to provide for a flow of fluid from said container means to effect expansion of said confinement from said collapsed condition to said expanded condition, sensor means for detecting the occurrence of a collision, and nonelectrical means operatively interconnecting said sensor means and said means for opening said container means, said nonelectrical means being destructable to effect operation of said means for opening said container means, said sensor means including means for initiating destruction of said nonelectrical means in response to the occurrence of an accident to thereby provide for operation of said means for opening said container means and a flow of fluid to effect expansion of said confinement to the expanded condition upon the occurrence of an accident.

22. Safety apparatus as set forth in claim 21 wherein said nonelectrical means includes detonating fuse means extending between said sensor means and said means for opening said container means and explosive means operatively connected to said detonating fuse means, said means for initiating destruction of said nonelectrical means including means for activating said explosive means to thereby effect detonation of said detonating fuse means.

23. Safety apparatus as set forth in claim 21 wherein said means for initiating destruction of said nonelectrical means includes a member mounted for movement relative to said nonelectrical means and spring means for impacting said member against said nonelectrical means upon the occurrence of a collision to initiate destruction of said nonelectrical means.

24. Safety apparatus as set forth in claim 23 wherein said means for opening said container means includes means for rupturing said container means.

(References on following page)

References Cited

UNITED STATES PATENTS

| | | | |
|---|---|---|---|
| 2,477,933 | 8/1949 | Labser | 296—84 |
| 2,715,365 | 8/1955 | Godchaux et al. | 102—27 |
| 2,755,125 | 7/1956 | Hodges | 280—150 |
| 2,842,372 | 7/1958 | D'Antini | 280—150 |
| 2,931,665 | 4/1960 | Sandor | 280—150 |
| 3,197,234 | 7/1965 | Bertrand | 280—150 |
| 3,414,292 | 12/1968 | Oldberg et al. | 280—150 |
| 3,430,979 | 3/1969 | Terry et al. | 280—150 |
| 3,450,414 | 6/1969 | Kobori | 280—150 |

KENNETH H. BETTS, Primary Examiner

U.S. Cl. X.R.

180—91; 102—27